United States Patent
Moilanen et al.

(10) Patent No.: US 9,204,450 B2
(45) Date of Patent: Dec. 1, 2015

(54) DYNAMIC SPECTRUM REFARMING WITH MULTIPLE CARRIERS

(75) Inventors: Jani Matti Johannes Moilanen, Helsinki (FI); Antti Anton Toskala, Espoo (FI); Timo Erkki Lunttila, Espoo (FI); Sabine Roessel, Munich (DE); Woonhee Hwang, Espoo (FI); Mikko Saily, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 247 days.

(21) Appl. No.: 13/990,442

(22) PCT Filed: Nov. 30, 2010

(86) PCT No.: PCT/EP2010/068545
§ 371 (c)(1),
(2), (4) Date: Jul. 1, 2013

(87) PCT Pub. No.: WO2012/072118
PCT Pub. Date: Jun. 7, 2012

(65) Prior Publication Data
US 2013/0294415 A1   Nov. 7, 2013

(51) Int. Cl.
*H04W 16/00* (2009.01)
*H04W 72/04* (2009.01)
*H04W 16/14* (2009.01)

(52) U.S. Cl.
CPC .......... *H04W 72/0486* (2013.01); *H04W 16/14* (2013.01)

(58) Field of Classification Search
CPC . H04W 16/14; H04W 72/0486; H04W 4/006; H04W 52/244; H04W 16/00; H04W 8/00; H04L 12/186; H04L 12/1836; H04L 47/827
USPC .......... 370/252, 277, 310, 327–331, 335, 338, 370/341, 343–345, 431, 441–442; 455/422.1, 429, 432.1, 435.2, 436, 455/442–444, 450–452.1, 453–454
See application file for complete search history.

(56) References Cited

U.S. PATENT DOCUMENTS 8,311,554 B2 * 11/2012 Abedi .......................... 455/454
2004/0047312 A1 * 3/2004 Muszynski et al. ........... 370/331
(Continued)

FOREIGN PATENT DOCUMENTS

WO    WO 2010/091713    8/2010

OTHER PUBLICATIONS

Mihovska, A., et al., "Multi-Operator Resource Sharing Scenario in the context of IMT-Advanced Systems", © 2009 IEEE, 5 pgs.

*Primary Examiner* — Charles C Jiang
*Assistant Examiner* — Mohamed Kamara
(74) *Attorney, Agent, or Firm* — Harrington & Smith

(57) ABSTRACT

The present invention relates to dynamic spectrum refarming with multiple carriers. At a first communication system of a first radio access technology, a request is received in a first signaling message from a second communication system of a second radio access technology, the request including information on availability of spectrum blocks shared between the first and second communication systems. The availability of the spectrum blocks may have been determined based on a load of the second communication system. The first communication system performs carrier aggregation mechanisms based on the information with respect to the spectrum blocks, and may transmit a response to the request in a second signaling message to the second communication system, the response including an acknowledgment of an activation/deactivation of at least one additional carrier and/or a corresponding carrier aggregation.

32 Claims, 6 Drawing Sheets

(56) References Cited

U.S. PATENT DOCUMENTS

| | | | |
|---|---|---|---|
| 2009/0059856 A1* | 3/2009 | Kermoal et al. | 370/329 |
| 2009/0135767 A1* | 5/2009 | Silk et al. | 370/329 |
| 2010/0098012 A1 | 4/2010 | Bala et al. | 370/329 |
| 2010/0233962 A1* | 9/2010 | Johansson et al. | 455/63.1 |
| 2013/0107766 A1* | 5/2013 | Etemad | 370/280 |

* cited by examiner

DYNAMIC SPECTRUM REFARMING WITH MULTIPLE CARRIERS

The present invention relates to dynamic spectrum refarming with multiple carriers.

In particular, the present invention relates to dynamic spectrum refarming (DSR) where two radio access technologies (RATs) share same spectrum and the spectrum shares are assigned based on cell load as illustrated in FIG. 1. In case the cell load of a communication system of a radio access technology 2 (RAT2) is low in a particular cell of a cellular communications system, a communication system of a radio access technology 1 (RAT1) which shares spectrum blocks with the RAT2 communication system may use all of the shared spectrum blocks (i.e. all of the bandwidth shared between the communication systems). With an increasing cell load of the RAT2 communication system, the shared spectrum blocks should be assigned more and more to the RAT2 communication system.

Main motivations for dynamic spectrum refarming are
smooth migration to newer technologies (no need to worry when is the cross-over point to do refarming, or what is the right capacity balance),
higher user throughputs & lower call blocking (bandwidth optimized according to instantaneous load), and
power saving (putting to sleep excess capacity).

Dynamic adjustment of bandwidth between different RATs can be problematic even though different bandwidths are supported by the RATs.

An example of different RATs are GSM (global system for mobile communication) and LTE (long term evolution) systems.

For example, LTE supports different bandwidths from 1.4 MHz to 20 MHz and it is possible to indicate a bandwidth change with a broadcasted master information block (MIB) and related system information block (SIB). It will however take some time before all LTE UEs (user equipments) have an opportunity to receive the new MIB and SIBs. In the worst case this takes 40 s depending on a length of modification period (=modificationPeriodCoeff*defaultPagingCycle in frames). And more importantly, since the system has not been designed for dynamic spectrum adjustments it can not be guaranteed that legacy UEs would be able to follow such bandwidth adjustments, as any changes in MIB should be done via cell reset.

Another problem arises if spectrum shares differ between neighboring cells of the cellular communications system. GSM has significantly higher power spectral density, e.g. −13.5 dB in case of 5 MHz LTE, and therefore it will cause severe inter-system interference (IS-IF) towards LTE.

It is possible to assign the spectrum shares in such a way that IS-IF appears only at edges of the LTE spectrum as show in FIG. 2. However, IS-IF can be still very harmful for LTE control channels which are wide band transmissions, i.e. transmitted over entire LTE bandwidth.

LTE Release-10 (also known as LTE-Advanced) describes carrier aggregation (CA) providing a capability to aggregate together up to five LTE carriers referred to as component carriers (CCs). The basic principle of CA in LTE is illustrated in FIG. 3. According to the example of LTE-Advanced carrier aggregation shown in FIG. 3, an intra-band aggregation of carriers 1 and 2, and an inter-band aggregation of carrier 3 combined with carriers 1 and 2 are performed.

The idea of carrier aggregation is that a network may grant resources for a UE on multiple CCs instead of just one which is the case in LTE Release-8 and -9.

The present invention aims at overcoming the problems related to dynamic change of bandwidth between communication systems of different radio access technologies sharing blocks of spectrum or bandwidth, and inter-system interference.

Moreover, the present invention aims at establishing signaling mechanisms with minimal complexity, which enable a smart interaction between the communication systems, making it possible to utilize carrier aggregation for smooth and seamless spectrum refarming in dynamic/semi-static manner.

This is achieved by the apparatuses and methods as defined in the appended claims. The invention may also be implemented by a computer program product.

According to an embodiment of the invention, a bandwidth of a first communication system of a first radio access technology such as LTE can be dynamically changed without cell reset.

Moreover, backwards compatibility can be provided since carrier aggregation related changes are invisible to Release-10 UEs due to using standard carrier aggregation functionality, and legacy UEs may operate on a dedicated LTE carrier without any impact or potentially be handed over to one of shared carriers.

In addition, there is a possibility to control IS-IF efficiently. There is always a "clean" LTE carrier that can be used as an escape carrier for UEs that otherwise would be suffering too much from IS-IF. It is especially worth to notice that control channels on the clean carrier do not suffer from IS-IF.

In the following the invention will be described by way of embodiments thereof taking into account the accompanying drawings, in which.

Release-10 LTE carrier aggregation mechanisms allow basically for deactivation/de-configuration of some of CCs for all UEs, after which an eNodeB (eNB) can ramp down those CCs. However, there are no signaling mechanisms enabling smart interaction between a first communication system of a first radio access technology providing carrier aggregation mechanisms such as LTE and a second communication system of a second radio access technology such as GSM and TD-SCDMA (time division synchronous code division multiple access).

In the following embodiments of the invention will be described which define a signaling framework between the first and second communication systems, which allows for smooth and seamless dynamic spectrum refarming.

It is to be noted that the first and second communication systems are not limited to LTE and GSM/TD-SCDMA.

Figure 1:
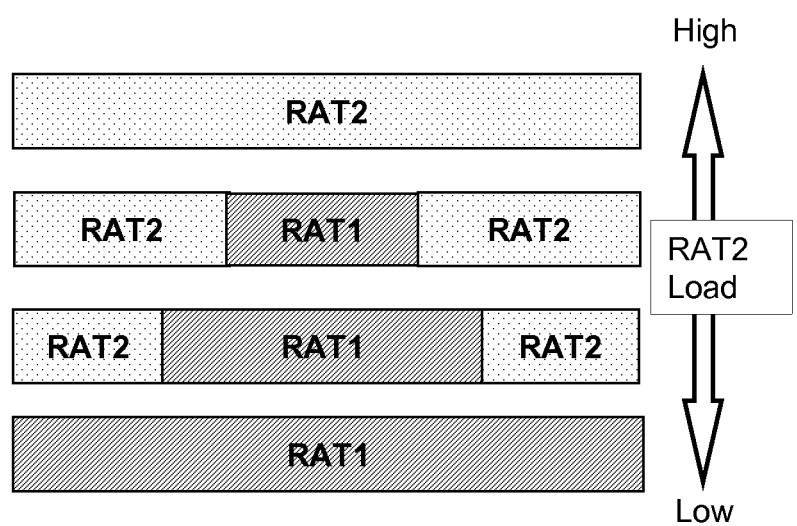
FIG. 1 shows a schematic diagram illustrating an example of dynamic spectrum refarming.
Figure 2:
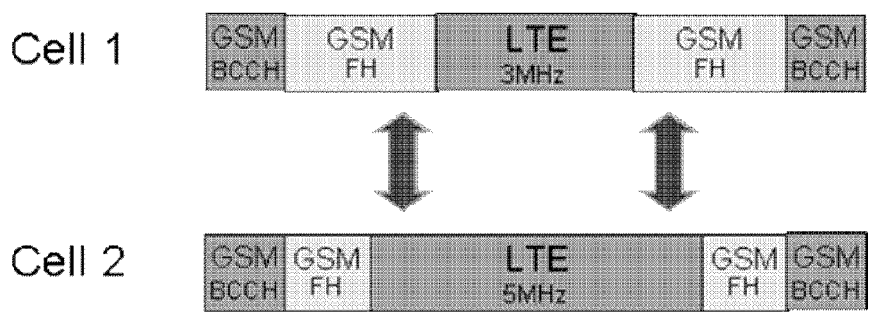
FIG. 2 shows a schematic diagram illustrating an example of inter-system interference with GSM-LTE DSR.
Figure 3:
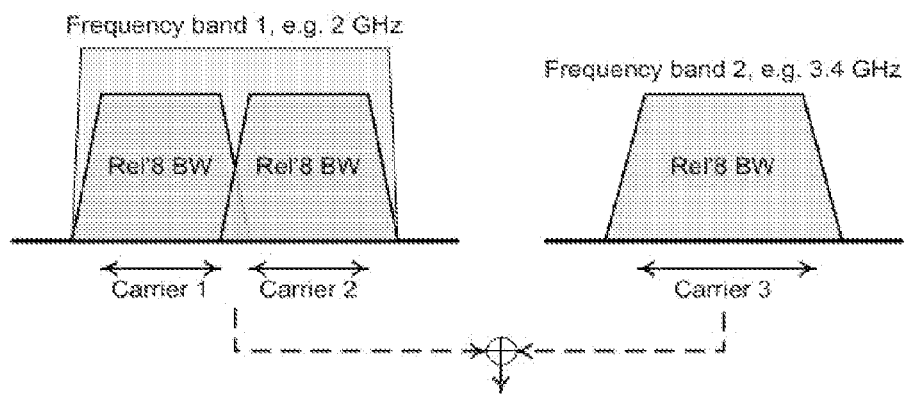
FIG. 3 shows a schematic diagram illustrating an example of LTE-Advanced carrier aggregation of both intra-band and inter-band.
Figure 4:
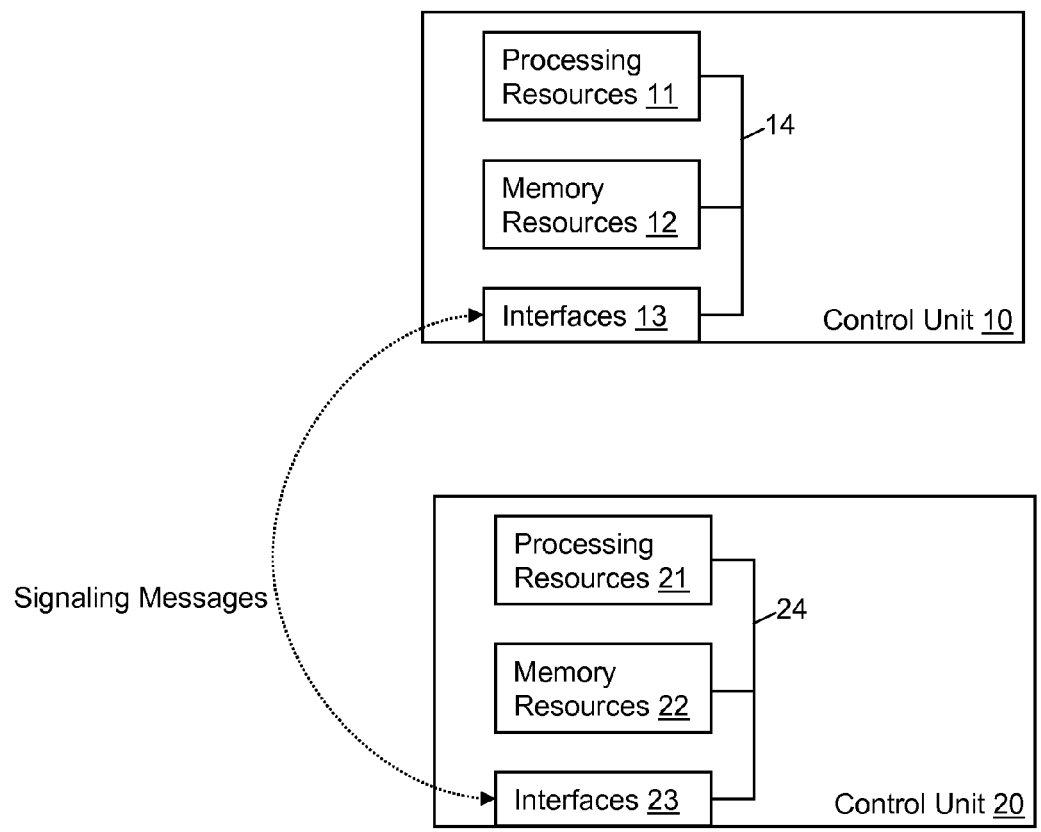
FIG. 4 shows a schematic block diagram illustrating an arrangement of control units according to an embodiment of the invention.

As a preliminary matter before exploring details of various implementations, reference is made to FIG. 4 for illustrating a simplified block diagram of various electronic devices that are suitable for use in practicing the exemplary embodiments of this invention.

A control unit 10 of the first communication system includes processing resources 11, memory resources 12 that may store a program, and interfaces 13 which may include a suitable radio frequency transceiver coupled to one or more antennas for bidirectional wireless communications over one or more wireless links. The processing resources 11, memory resources 12 and interfaces 13 may be coupled by a bus 14.

The control unit 10 may function as part of network elements providing access for user equipments to the first communication system. According to an embodiment of the invention, the control unit 10 may function as part of eNBs, 3G (third generation) NodeBs, or BTSs (base transceiver stations).

Similarly, a control unit 20 of the second communication system includes processing resources 21, memory resources 22 that may store a program, and interfaces 23 which may include a suitable radio frequency transceiver coupled to one or more antennas for bidirectional wireless communications over one or more wireless links. The processing resources 21, memory resources 22 and interfaces 23 may be coupled by a bus 24.

The control unit 20 may function as part of network elements providing access for user equipments to the second communication system. According to an embodiment of the invention, the control unit 20 may function as part of BSCs (base station controllers), 3G NodeBs, or BTSs.

The interfaces 13 and 23 may be used for signaling messages between the control units 10 and 20.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Programs stored by the memory resources 12, 23 are assumed to include program instructions that, when executed by the associated processing resources, enable the electronic device to operate in accordance with the exemplary embodiments of this invention, as detailed below. Inherent in the processing resources 11, 21 is a clock to enable synchronism among the various apparatus for transmissions and receptions within the appropriate time intervals and slots required, as the scheduling grants and the granted resources/subframes are time dependent. The transceivers of the interfaces 13, 23 include both transmitter and receiver, and inherent in each is a modulator/demodulator commonly known as a modem. The interfaces 13, 23 may also include a modem to facilitate communication over (hardwire) links.

In general, the exemplary embodiments of this invention may be implemented by computer software stored in the memory resources 12, 22 and executable by the processing resources 11, 21 of the control units 10, 20, or by hardware, or by a combination of software and/or firmware and hardware in any or all of the devices shown.

The memory resources 12, 22 may be of any type suitable to the local technical environment and may be implemented using any suitable data storage technology, such as semiconductor-based memory devices, magnetic memory devices and systems, optical memory devices and systems, fixed memory and removable memory. The processing resources 11, 21 may be of any type suitable to the local technical environment, and may include one or more of general purpose computers, special purpose computers, microprocessors, digital signal processors (DSPs) and processors based on a multi-core processor architecture, as non-limiting examples.

According to an embodiment of the invention, carrier aggregation of an LTE system (first communication system of first radio access technology) is used to adjust overall LTE bandwidth for DSR purposes. When a load of a second communication system of a second radio access technology, e.g. a GSM system, is low in a cell of a cellular communications system, additional LTE carrier(s) that are at least partly shared with the GSM system are activated for the cell and they are aggregated by using LTE carrier aggregation.

When a load of the GSM system is high, additional LTE carrier(s) and the corresponding carrier aggregation are deactivated, i.e. LTE bandwidth is down-scaled. For this purpose, it may be decided per sector on a unique primary cell, i.e. PCell or primary component carrier (PCC), per UE connected to the LTE system. This decision can be based on neighbor cell interference as estimated from measurement reports of the UEs connected to the LTE system. Alternatively or in addition, this decision can be based on signaling from the GSM system to the LTE system on which GSM carriers are most active. Intra-cell handover of all UEs of the LTE system is performed which are RRC_CONNECTED (RRC=radio resource control) to a non-selected primary cell to have RRC_CONNECTED of all UEs on the unique primary cell.

The need/possibility to disable/enable LTE carriers and carrier aggregation is communicated between the GSM system and the LTE system.

As a UE of the LTE system does not need to read system information to access the additional carrier (i.e. secondary carrier) but a network node of the LTE system, e.g. an eNB, provides it in a dedicated message when it configures the secondary carrier for carrier aggregation, changing of MIB or SIB contents can be applied right away in the UE.

Figure 5:
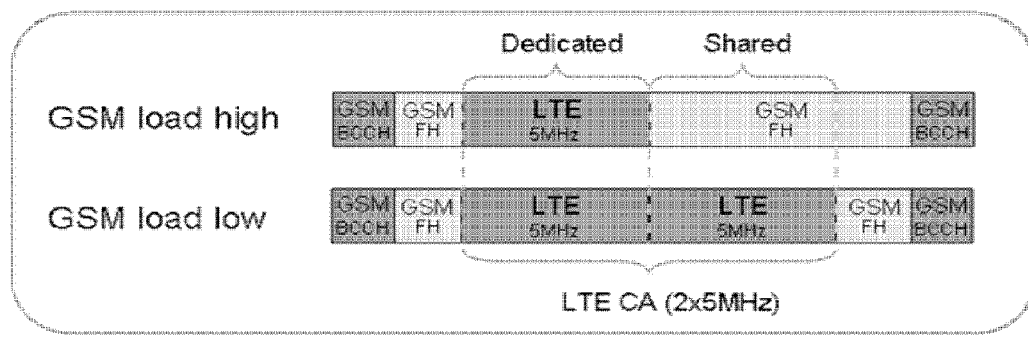
FIG. 5 shows a schematic diagram illustrating an example of dynamic spectrum refarming with LTE carrier aggregation according to an embodiment of the invention.

An example solution with two 5 MHz component carriers is illustrated in FIG. 5. As shown in FIG. 5, in case a load of the second communication system (GSM in this example) is low, the two 5 MHz component carriers are aggregated, one of which is a dedicated carrier of the first communication system (LTE in this example), and the other is an additional carrier corresponding to a spectrum block shared between the first and second communication systems. In case the load of the GSM system is high, the additional carrier and the carrier aggregation are deactivated so that the shared spectrum block can be used by the GSM system.

As mentioned above, dynamic spectrum refarming is possible also for other technologies than GSM-LTE. For example, the LTE carrier aggregation may be used together with HSPA multi-carrier to provide a similar dynamic spectrum refarming solution for HSPA-LTE.

Figure 6:
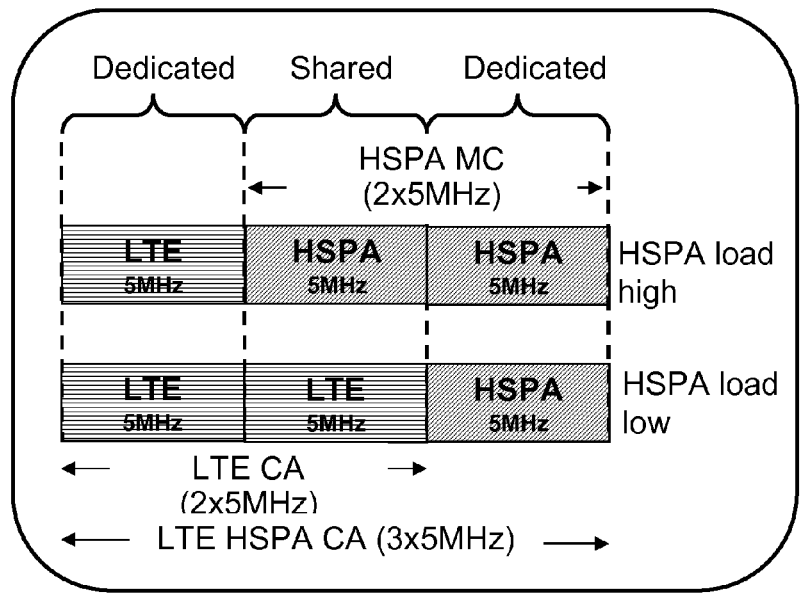
FIG. 6 shows a schematic diagram illustrating an example of dynamic spectrum refarming with LTE carrier aggregation according to another embodiment of the invention.

FIG. 6 illustrates an example solution of dynamic spectrum refarming with LTE carrier aggregation used together with HSPA multi-carrier. As shown in FIG. 6, the LTE system comprises a dedicated spectrum block of 5 MHz, and the HSPA system comprises a dedicated spectrum block of 5 MHz. There also is a spectrum block of 5 MHz shared between the LTE and HSPA systems. When a cell load of the HSPA system is low, a dedicated carrier corresponding to the dedicated spectrum block of the LTE system and an additional carrier corresponding to the shared spectrum block may be aggregated and used by the LTE system. In case the cell load of the HSPA system is high, the additional carrier and the carrier aggregation may be deactivated so that the shared spectrum block can be used by the HSPA system.

According to an embodiment of the invention, the first communication system (e.g. an eNB of LTE) may be informed about a level of inter-system interference on each of carriers which may be carriers shared between the first and second communication systems.

The inter-system interference may be controlled by utilizing at least one of the following methods:
  allow carrier aggregation only to UEs of the first communication system (e.g. LTE) that have high enough signal quality to cope with the inter-system interference,
  adjust signal quality estimates of the first communication system based on the level of inter-system interference, which leads to usage of more robust modulation and coding schemes on a shared carrier, and
  limit transmit power of the second communication system (e.g. GSM) on shared carriers, e.g. if they are known to interfere the first communication system.

According to an embodiment of the invention, depending on the need for spectrum for GSM system use, first a component carrier of a particular bandwidth may be deactivated and reactivated with a smaller or larger bandwidth.

Again it is noted that the first and second communication systems are not limited to LTE and GSM. The second communication system may comprise TD-SCDMA which may provide the corresponding signaling of the spectrum need.

Figure 7:
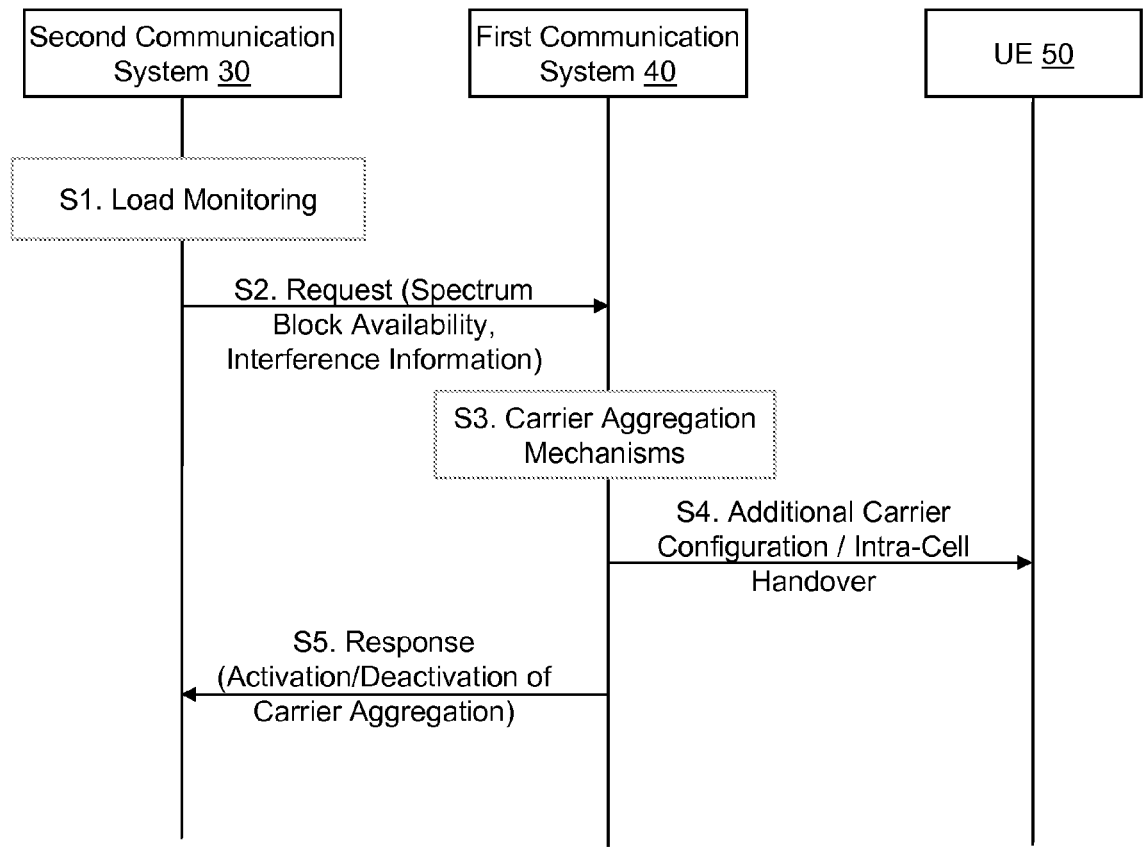
FIG. 7 shows a schematic diagram illustrating signaling between first and second communication systems according to an embodiment of the invention.

FIG. 7 shows a schematic block diagram illustrating signaling between first and second communication systems according to an embodiment of the present invention.

In step S1, a communication system (second communication system 30) performs load monitoring. The second communication system 30 adopts a radio access technology (second radio access technology), such as GSM or TD-SCDMA, for example. The second communication system 30 may comprise the control unit 20 shown in FIG. 4, which may function as part of a BSC.

The second communication system 30 determines an availability of spectrum blocks shared between the second communication system and a first communication system 40 of a first radio access technology based on the load. In step S2 the second communication system 30 sends a request in a first signaling message to the first communication system 40 which is capable of performing carrier aggregation mechanisms, the request including information on the availability of the spectrum blocks.

The second communication system 30 may calculate a level of inter-system interference between the first and second communication systems, at least on carriers shared between the first and second communication systems, and include interference information on the inter-system interference into the request.

The first communication system 40 receives the request and, in step S3, performs carrier aggregation mechanisms based on the information on availability of spectrum blocks shared between the first and second communication systems, which is included in the request, with respect to the spectrum blocks. The first communication system 40 adopts a radio access technology (first radio access technology, which is different from the second radio access technology), such as LTE, for example. The first communication system 40 may comprise the control unit 10 shown in FIG. 4, which may function as part of an eNB.

In case the information indicates availability of at least one of the spectrum blocks, the first communication system 40 activates at least one additional carrier corresponding to the at least one spectrum block and aggregates the at least one additional carrier using the carrier aggregation mechanisms. In case the information indicates unavailability of at least one of the spectrum blocks, the first communication system 40 deactivates at least one additional carrier corresponding to the at least one spectrum block and deactivates the corresponding carrier aggregation using the carrier aggregation mechanisms.

For activating and aggregating the at least one additional carrier, the first communication system 40 may deactivate a carrier of a particular bandwidth and reactivate the carrier with a larger bandwidth corresponding to the at least one spectrum block, and for deactivating the at least one additional carrier and the corresponding carrier aggregation, the first communication system 40 may deactivate a carrier of a particular bandwidth and reactivate the carrier with a smaller bandwidth corresponding to the at least one spectrum block.

The first communication system 40 may control the inter-system interference based on the interference information included in the request received from the second communication system 30. The first communication system 40 may allow carrier aggregation only for user equipments of the first communication system 40 that have signal quality that is high enough to cope with the inter-system interference, and/or adjust signal quality estimates of the first communication system based on the level of inter-system interference.

In step S4, the first communication system 40 informs a UE 50 about the activation of the at least one additional carrier. That is, the first communication system 40 provides system information to access the at least one additional carrier to the UE 50 in a dedicated message when it configures the at least one additional carrier for the carrier aggregation.

When the at least one carrier and the corresponding carrier aggregation are to be deactivated by the first communication system 40, the first communication system 40 decides per sector on a unique primary carrier for the user equipment 50, and performs an intra-cell handover of the user equipment 50 to the unique primary carrier when the user equipment 50 is connected to a primary carrier different from the unique primary carrier (step S4).

The first communication system 40 may decide the unique primary carrier based on neighbor cell interference estimated from measurement reports of user equipments connected to the first communication system, which may include the user equipment 50, and/or based on signaling from the second communication system 30 on activities of carriers of the second communication system.

In step S5, the first communication system 40 transmits a response to the request in a second signaling message to the second communication system 30, the response including an acknowledgment of an activation/deactivation of the at least one additional carrier and/or the corresponding carrier aggregation.

The first signaling message sent in step S1 may be a virtual inter-system handover request message and the second signaling message sent in step S5 may be a virtual inter-system handover response message.

Figure 8:
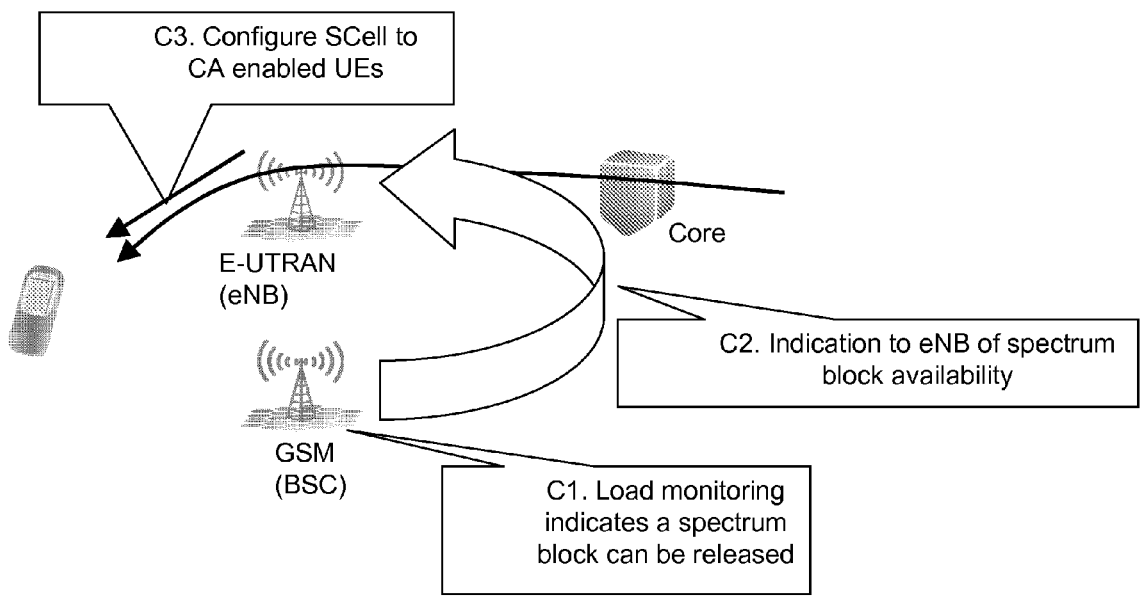
FIG. 8 shows a schematic diagram illustrating an example implementation of LTE spectrum increase according to an embodiment of the invention.

FIG. 8 shows an example implementation of an embodiment of the invention with LTE carrier aggregation, and specifically the case where LTE carrier aggregation is activated in response to the request from the second communication system (GSM in this example), i.e. LTE bandwidth is up-scaled.

In step C1, the GSM system, e.g. a BSC, monitors its load, and the load monitoring indicates that a spectrum block can be released. In step C2, the GSM system sends an indication to the first communication system (LTE in this example), e.g. an eNB of an E-UTRAN (evolved universal terrestrial radio access network), of spectrum block availability. In step C3, the eNB configures an SCell (secondary cell, secondary/additional component carrier) to UEs of the LTE system which are carrier aggregation enabled.

The example implementation shown in FIG. 8 may be further enhanced by adding a fourth step where the LTE eNB acknowledges the activation of carrier aggregation to the BSC of the GSM system.

Deactivation of a carrier aggregation may be implemented in a similar manner. That is, the GSM system, e.g. the BSC, monitors its load, and sends an indication to the eNB of spectrum block unavailability. The LTE system, e.g. the eNB deactivates the carrier aggregation and sends an acknowledgement for the deactivation to the BSC.

In order to support multi-vendor deployments, changes to the GSM and LTE specifications are required to introduce the necessary signaling between GSM (BSC) and LTE (eNB).

For this purpose, inter-system handover signaling may be used in order to minimize the amount of changes to the specifications. That is, the BSC sends a "virtual HO (handover) request" to the eNB, which further may include an indication of inter-system interference. The eNB sends a "virtual HO response" to acknowledge the activation/deactivation of additional carriers, and/or carrier aggregation.

The virtual HO request and the virtual HO response refer to picky-bagged inter-system HO messages that are known by both entities (BSC and eNB) to indicate LTE carrier (or carrier aggregation) activation/deactivation instead of actual hand-over. Furthermore, load balancing messages or information exchange messages may be sent between the BSC and eNB in order to exchange load information.

In case of single vendor deployment with co-located GSM and LTE base stations, the communication between the BSC and eNB may be implemented through a proprietary interface between GSM BTS (base station) and LTE eNB. In addition, GSM BTS has to communicate with BSC via a proprietary interface. Also some communication between neighboring BSCs may be implemented.

With the present invention it is possible to implement dynamic spectrum refarming without requiring a cell reset. In addition, performance of the dynamic spectrum refarming is improved via enhanced inter-system interference control.

According to an aspect of the invention, an apparatus of a first communication system of a first radio access technology, such as the first communication system 40 shown in FIG. 7 or the control unit 10 shown in FIG. 4, for example, comprises receiving means for receiving a request in a first signaling message from a second communication system of a second radio access technology, the request including information on availability of spectrum blocks shared between the first and second communication systems, and performing means for performing carrier aggregation mechanisms based on the information with respect to the spectrum blocks.

The apparatus may further comprise activating means and aggregating means for, in case the information indicates availability of at least one of the spectrum blocks, activating at least one additional carrier corresponding to the at least one spectrum block and aggregating the at least one additional carrier using the carrier aggregation mechanisms. The apparatus may further comprise deactivating means for, in case the information indicates unavailability of at least one of the spectrum blocks, deactivating at least one additional carrier corresponding to the at least one spectrum block and deactivating the corresponding carrier aggregation using the carrier aggregation mechanisms.

The apparatus may further comprise deactivating and reactivating means which, for activating and aggregating the at least one additional carrier, deactivate a carrier of a particular bandwidth and reactivate the carrier with a larger bandwidth corresponding to the at least one spectrum block. For deactivating the at least one additional carrier and the corresponding carrier aggregation, the deactivating and reactivating means may deactivate a carrier of a particular bandwidth and reactivate the carrier with a smaller bandwidth corresponding to the at least one spectrum block.

The apparatus may further comprise transmitting means for transmitting a response to the request in a second signaling message to the second communication system, the response including an acknowledgment of an activation/deactivation of the at least one additional carrier and/or the corresponding carrier aggregation.

The first signaling message may be a virtual inter-system handover request message and the second signaling message may be a virtual inter-system handover response message.

The receiving means may receive the request from a network node of the second communication system, wherein the apparatus may comprise the network node.

The request may further include interference information on a level of inter-system interference between the first and second communication systems, at least on carriers shared between the first and second communication systems, and the apparatus may further comprise controlling means for controlling the inter-system interference based on the interference information.

The apparatus may further comprise allowing means for allowing carrier aggregation only for user equipments of the first communication system that have signal quality that is high enough to cope with the inter-system interference, and/or adjusting means for adjusting signal quality estimates of the first communication system based on the level of inter-system interference.

For deactivating the at least one additional carrier and the corresponding carrier aggregation, the apparatus may further comprise deciding means for deciding per sector on a unique primary carrier per user equipment, and performing means for performing an intra-cell handover of each of user equipments connected to a primary carrier different from the unique primary carrier to the unique primary carrier.

The deciding means may decide the unique primary carrier based on neighbor cell interference estimated from measurement reports of the user equipments and/or based on signaling from the second communication system on activities of carriers of the second communication system.

According to an aspect of the invention, an apparatus of the second communication system of the second radio access technology, such as the communication system 30 of FIG. 7 or the control unit 20 shown in FIG. 4, for example, comprises monitoring means for monitoring a load of the apparatus, determining means for determining an availability of spectrum blocks shared between the second communication system and the first communication system of the first radio access technology based on the load, and sending means for sending a request in a first signaling message to the first communication system which is capable of performing carrier aggregation mechanisms, the request including information on the availability of the spectrum blocks.

The apparatus may further comprise calculating means for calculating a level of inter-system interference between the first and second communication systems, at least on carriers shared between the first and second communication systems, and including means for including interference information on the inter-system interference into the request.

The apparatus may further comprise signaling means for signaling activities of carriers of the second communication system to the first communication system.

The apparatus may further comprise receiving means for receiving a response to the request in a second signaling message from the first communication system, the response including an acknowledgment of an activation/deactivation of at least one additional carrier and/or a corresponding carrier aggregation.

The apparatus may further comprise limiting means for limiting a transmit power of the second communication system on at least one carrier shared between the first and second communication systems.

According to an embodiment of the invention, at a first communication system 40 of a first radio access technology, a request is received in a first signaling message S2 from a second communication system 30 of a second radio access technology, the request including information on availability of spectrum blocks shared between the first and second communication systems. The availability of the spectrum blocks may have been determined based on a load of the second communication system 30. The first communication system 40 performs carrier aggregation mechanisms based on the information with respect to the spectrum blocks, and may transmit a response to the request in a second signaling message S5 to the second communication system, the response including an acknowledgment of an activation/deactivation of at least one additional carrier and/or a corresponding carrier aggregation.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising:
at least one processor; and
at least one memory including computer program code, where the at least one memory and the computer program code are configured, with the at least one processor, to cause the apparatus of a first communication system of a first radio access technology to:
receive a request in a first signaling message from a second communication system of a second radio access technology, the request including information on availability of at least one spectrum block shared between the first and second communication systems, and
perform at least one of activating and deactivating at least one additional carrier corresponding to the at least one spectrum block using carrier aggregation mechanisms based on the information with respect to the at least one spectrum block.

2. The apparatus of claim 1, wherein the at least one memory including the computer program code is configured with the at least one processor to cause the apparatus to:
in case the information indicates availability of the at least one spectrum block, activate at least one additional carrier corresponding to the at least one spectrum block and aggregate the at least one additional carrier using the carrier aggregation mechanisms, and in case the information indicates unavailability of the at least one spectrum block, deactivate at least one additional carrier corresponding to the at least one spectrum block and deactivate the corresponding carrier aggregation using the carrier aggregation mechanisms.

3. The apparatus of claim 1, wherein the at least one memory including the computer program code is configured with the at least one processor to cause the apparatus to:
for activating and aggregating the at least one additional carrier, deactivate a carrier of a particular bandwidth and reactivate the carrier with a larger bandwidth corresponding to the at least one spectrum block, and
for deactivating the at least one additional carrier, deactivate a carrier of a particular bandwidth and reactivate the carrier with a smaller bandwidth corresponding to the at least one spectrum block.

4. The apparatus of claim 2, wherein the at least one memory including the computer program code is configured with the at least one processor to cause the apparatus to transmit a response to the request in a second signaling message to the second communication system, the response including an acknowledgment of an activation or deactivation of the at least one additional carrier and the corresponding carrier aggregation.

5. The apparatus of claim 4, wherein the first signaling message is a virtual inter-system handover request message and the second signaling message is a virtual inter-system hand-over response message.

6. The apparatus of claim 1, wherein the at least one memory including the computer program code is configured with the at least one processor to cause the apparatus to receive the request from a network node of the second communication system, and the apparatus comprises the network node.

7. The apparatus of claim 1, wherein the request further includes interference information on a level of inter-system interference between the first and second communication systems, at least on carriers shared between the first and second communication systems, and the at least one memory including the computer program code is configured with the at least one processor to cause the apparatus to control the inter-system interference based on the interference information.

8. The apparatus of claim 7, wherein the at least one memory including the computer program code is configured with the at least one processor to cause the apparatus to at least one of:
allow carrier aggregation only for user equipment of the first communication system that have signal quality that is high enough to cope with the inter-system interference, and
adjust signal quality estimates of the first communication system based on the level of inter-system interference.

9. The apparatus of claim 2, wherein for deactivating the at least one additional carrier and the corresponding carrier aggregation the at least one memory including the computer program code is configured with the at least one processor to cause the apparatus to decide per sector on a unique primary carrier per user equipment, and perform an intra-cell handover of each of user equipment connected to a primary carrier different from the unique primary carrier to the unique primary carrier.

10. The apparatus of claim 9, wherein the at least one memory including the computer program code is configured with the at least one processor to cause the apparatus to:
decide the unique primary carrier based on neighbor cell interference estimated from at least one of measurement reports of the user equipment and based on signaling from the second communication system on activities of carriers of the second communication system.

11. An apparatus comprising:
at least one processor; and
at least one memory including computer program code, where the at least one memory and the computer program code are configured, with the at least one processor, to cause
the apparatus of a second communication system of a second radio access technology to:
monitor its load,
determine an availability of at least one spectrum block shared between the second communication system and a first communication system of a first radio access technology based on the load, and
send a request in a first signaling message to the first communication system which is capable of performing at least one of activating and deactivating of at least one additional carrier corresponding to the at least one spectrum block using carrier aggregation mechanisms, the request including information on the availability of the at least one spectrum block.

12. The apparatus of claim 11, wherein the at least one memory including the computer program code is configured with the at least one processor to cause the apparatus to calculate a level of inter-system interference between the first and second communication systems, at least on carriers shared between the first and second communication systems, and include interference information on the inter-system interference into the request.

13. The apparatus of claim 11, wherein the is at least one memory including the computer program code is configured with the at least one processor to cause the apparatus to signal activities of carriers of the second communication system to the first communication system.

14. The apparatus of claim 11, wherein the at least one memory including the computer program code is configured with the at least one processor to cause the apparatus to receive a response to the request in a second signaling message from the first communication system, the response including an acknowledgment of an activation or deactivation of at least one additional carrier and a corresponding carrier aggregation.

15. The apparatus of claim 11, wherein the at least one memory including the computer program code is configured with the at least one processor to cause the apparatus to limit a transmit power of the second communication system on at least one carrier shared between the first and second communication systems.

16. A method comprising:
receiving, at a first communication system of a first radio access technology, a request in a first signaling message from a second communication system of a second radio access technology, the request including information on availability of at least one spectrum block shared between the first and second communication systems; and
performing at least one of activating and deactivating at least one additional carrier corresponding to the at least one spectrum block using carrier aggregation mechanisms based on the information with respect to the at least one spectrum block.

17. The method of claim 16, comprising:
in case the information indicates availability of the at least one spectrum block, activating at least one additional carrier corresponding to the at least one spectrum block and aggregating the at least one additional carrier using the carrier aggregation mechanisms; and
in case the information indicates unavailability of the at least one spectrum block, deactivating at least one additional carrier corresponding to the at least one spectrum block and deactivating the corresponding carrier aggregation using the carrier aggregation mechanisms.

18. The method of claim 17, comprising:
for activating and aggregating the at least one additional carrier, deactivating a carrier of a particular band-width and reactivating the carrier with a larger bandwidth corresponding to the at least one spectrum block; and
for deactivating the at least one additional carrier and the corresponding carrier aggregation, deactivating a carrier of a particular bandwidth and reactivating the carrier with a smaller bandwidth corresponding to the at least one spectrum block.

19. The method of claim 17, comprising:
transmitting a response to the request in a second signaling message to the second communication system, the response including an acknowledgment of an activation or deactivation of the at least one additional carrier and the corresponding carrier aggregation.

20. The method of claim 19, wherein the first signaling message is a virtual inter-system handover request message and the second signaling message is a virtual inter-system handover response message.

21. The method of claim 16, wherein the request further includes interference information on a level of inter-system interference between the first and second communication systems, at least on carriers shared between the first and second communication systems, and the method comprises:
controlling the inter-system interference based on the interference information.

22. The method of claim 21, comprising at least one of:
allowing carrier aggregation only for user equipment of the first communication system that have signal quality that is high enough to cope with the inter-system interference, and
adjusting signal quality estimates of the first communication system based on the level of inter-system interference.

23. The method of claim 16, comprising:
for deactivating the at least one additional carrier and the corresponding carrier aggregation, deciding per sector on a unique primary carrier per user equipment, and performing an intra-cell handover of each of user equipment connected to a primary carrier different from the unique primary carrier to the unique primary carrier.

24. The method of claim 23, comprising:
deciding the unique primary carrier based on neighbor cell interference estimated from at least one of measurement reports of the user equipment and based on signaling from the second communication system on activities of carriers of the second communication system.

25. A method comprising:
monitoring a load of a second communication system of a second radio access technology;
determining an availability of at least one spectrum block shared between the second communication system and a first communication system of a first radio access technology based on the load; and
sending a request in a first signaling message to the first communication system which is capable of performing at least one of activating and deactivating of at least one additional carrier corresponding to the at least one spectrum block using carrier aggregation mechanisms, the request including information on the availability of the at least one spectrum block.

26. The method of claim 25, comprising:
calculating a level of inter-system interference between the first and second communication systems, at least on carriers shared between the first and second communication systems, and including interference information on the inter-system interference into the request.

27. The method of claim 25, comprising:
signaling activities of carriers of the second communication system to the first communication system.

28. The method of claim 25, comprising:
receiving a response to the request in a second signaling message from the first communication system, the response including an acknowledgment of an activation/deactivation of at least one additional carrier and a corresponding carrier aggregation.

29. The method of claim 25, comprising: limiting a transmit power of the second communication system on at least one carrier shared between the first and second communication systems.

30. A computer program product including a program for a processing device, comprising software code portions executed by a processor for performing the method of claim 16 when the program is run on the processing device.

31. The computer program product according to claim 30, wherein the computer program product comprises a non-transitory computer-readable medium on which the software code portions are stored.

32. The computer program product according to claim 30, wherein the program is directly loadable into an internal memory of the processing device.

* * * * *

UNITED STATES PATENT AND TRADEMARK OFFICE
CERTIFICATE OF CORRECTION

PATENT NO. : 9,204,450 B2  
APPLICATION NO. : 13/990442  
DATED : December 1, 2015  
INVENTOR(S) : Moilanen et al.

Page 1 of 1

It is certified that error appears in the above-identified patent and that said Letters Patent is hereby corrected as shown below:

In the claims

Claim 13, col. 11, line 32 "is" should be deleted.

Signed and Sealed this
Seventeenth Day of May, 2016

Michelle K. Lee
*Director of the United States Patent and Trademark Office*